S. V. WARNER.
COFFEE POT.
No. 95,959. Patented Oct. 19, 1869.
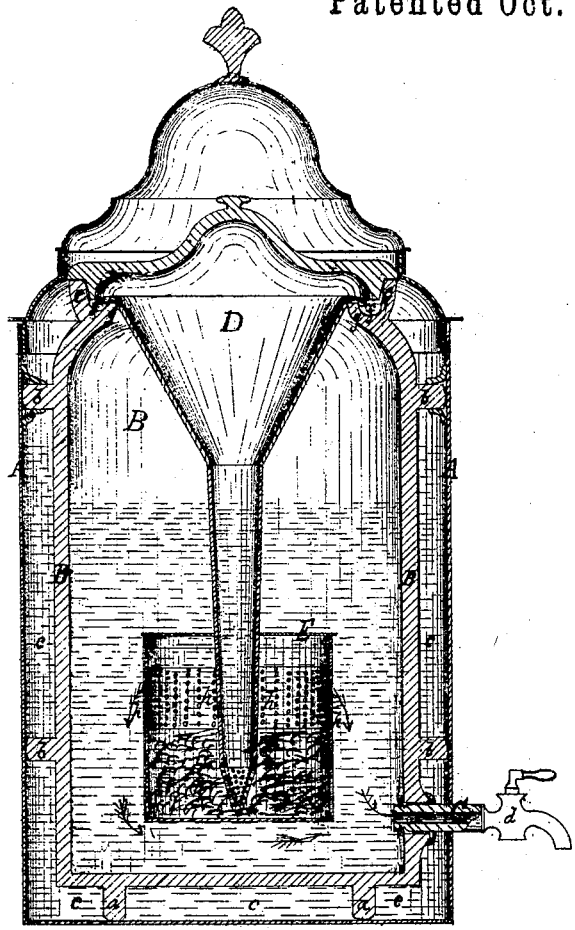
Witnesses.
C. N. Woodward.
J. R. Dvalle
S. V. Warner
by
J. Mason & Co.
Atty

United States Patent Office.

SETH V. WARNER, OF BUFFALO, NEW YORK.

Letters Patent No. 95,959, dated October 19, 1869.

COFFEE-POT.

The Schedule referred to in these Letters Patent and making part of the same.

*To all whom it may concern:*

Be it known that I, SETH V. WARNER, of Buffalo, in the county of Erie, and State of New York, have invented certain new and useful Improvements in Coffee-Urns; and I do hereby declare that the following is a full and exact description thereof, reference being had to the accompanying drawings, making part of this specification, in which the figure shows a vertical section of my improved urn and strainer.

My invention consists in combining an inner earthenware jar, for holding coffee after it is made, with an outer metal case or urn, with a space between the two for boiling water, which will keep the coffee in the earthen jar hot, without permitting it to boil.

Also providing said jar with a removable and peculiarly-formed filter, to be hereinafter described, the whole making an urn in which tea or coffee is not only held, but made and filtered.

In the drawings—

A represents the outer metal case, and

B, the enclosed earthen or stoneware jar, standing on feet *a a*, and having lugs *b b* on its sides to keep it steady, leaving space *c c*, to allow a free circulation of the boiling water around and under said jar.

Through the outer metal case, and into the inner jar, at a low point, is placed a pipe, C, with faucet *d* attached. This pipe is firmly secured to the inner jar, and also to the outer case, to prevent leakage.

The top of the jar has a raised rim, *e*, on which a cover sits, leaving a circular seat or groove, *f f*, into which the steam (if any is generated) and moisture fall, making a kind of air-tight packing, so that no vapor or fluid can get out or in when the cover is on.

Inside this inner jar, and suspended on an inner rim, *g*, rests or hangs an elongated tunnel, D, with a coffee-holder and strainer, E, attached, which is removable from the former when desired for cleaning, &c.

The nozzle of the tunnel is formed with a strainer, allowing the water to go through, but preventing any ingress of the coffee-grounds, the tunnel being for the sole purpose of introducing boiling water into the strainer E.

This coffee-holder and strainer is of cylindrical form, and is provided with fine perforations *h h*, which are made on the sides, and about two-thirds of the way up from the bottom where such holes are usually placed in ordinary filters.

I claim great advantage in this arrangement, as, when the filtering-holes are at or near the bottom, they constantly fill with dust or grounds of the coffee, requiring constant removal and cleaning.

In my case, the ground coffee is placed in the bottom of the circular holder, the boiling water poured into the tunnel D, and it strikes at the bottom and runs through the grounds, extracting the strength of the coffee, which runs up and pours out of the filtering-holes *h* into the earthen jar B, and there is always ready for use. These holes can never clog, and when the entire strength of the coffee is extracted, the tunnel can be taken out if desired for cleaning or renewing the coffee itself. The holes placed in this way, can be made of any degree of fineness, thereby making a better filter.

By this strainer, I claim that more coffee for use can be extracted from a pound of the ground bean, than by any other method, there being a slow and complete circulation.

One great advantage of employing an earthen jar for holding the tea or coffee is, that all metals are found injurious, and detract from the aroma and taste of the tea and coffee, also discoloring them.

It has also been found that by boiling the coffee, an important element of it is lost; therefore, instead of applying heat directly to the jar holding the coffee, I enclose it in a metal case, and form the space *c*, which contains the boiling water; this keeps the coffee sufficiently hot, but it never comes to the boiling-point.

By this combination I avoid drawing off the coffee as is usually done, and exposing it to the air, and thereby losing its aroma. By making it in this jar, the entire strength and aroma are utilized.

The urn stands over gas or any other arrangement for supplying heat to the bottom, which will boil the water in the space *c*.

There are various urns and coffee-pots in use, where steam is used as an agency to make the coffee, but my invention is for the purpose of keeping away all steam and consequent escape of aroma.

It is intended for hotels or large establishments, where there is a constant demand for hot tea or coffee.

I am acquainted with the patent of Thal and Schlotman, November 10, 1868, which shows an urn having a steam-chamber, and an inner metal case for holding coffee with the ordinary perforated screens. Such is not the equivalent of my device.

I claim, as my invention—

1. The combination and arrangement of the inner jar B, provided with feet *a a* and lugs *b b*, with the outer metal case A and circulating-water space *c c*, all operating in the manner and for the purpose herein specified.

2. Also, the combined tunnel and strainer D E, arranged as described, in combination with the jar B and outer case A, the whole operating in the manner and for the purpose set forth.

In witness whereof, I have hereunto signed my name, in the presence of two subscribing witnesses.

SETH V. WARNER.

Witnesses:
J. R. DRAKE,
ALBERT HAIGHT.